(12) United States Patent
Kobayashi

(10) Patent No.: US 10,216,202 B2
(45) Date of Patent: Feb. 26, 2019

(54) PRESSURE REGULATING VALVE

(71) Applicant: AISAN KOGYO KABUSHIKI KAISHA, Obu-shi, Aichi-ken (JP)

(72) Inventor: Masahiro Kobayashi, Toyohashi (JP)

(73) Assignee: AISAN KOGYO KABUSHIKI KAISHA, Obu (JP)

(*) Notice: Subject to any disclaimer, the term of this patent is extended or adjusted under 35 U.S.C. 154(b) by 0 days.

(21) Appl. No.: 15/457,237

(22) Filed: Mar. 13, 2017

(65) Prior Publication Data

US 2017/0285667 A1  Oct. 5, 2017

(30) Foreign Application Priority Data

Apr. 4, 2016 (JP) ................................. 2016-075392

(51) Int. Cl.
*G05D 16/10* (2006.01)

(52) U.S. Cl.
CPC ......... *G05D 16/106* (2013.01); *G05D 16/103* (2013.01); *Y10T 137/599* (2015.04)

(58) Field of Classification Search
CPC ............................ G05D 16/106; G05D 16/10; Y10T 137/7808; Y10T 137/781; Y10T 137/7811; Y10T 137/599
See application file for complete search history.

(56) References Cited

U.S. PATENT DOCUMENTS

| | | | | | |
|---|---|---|---|---|---|
| 3,211,175 A | * | 10/1965 | Replogle | .................. | A62B 9/02 137/493 |
| 3,981,327 A | * | 9/1976 | Sato | ........................ | G05D 16/10 137/505.25 |
| 4,246,876 A | * | 1/1981 | Bouwkamp | ........ | F02M 41/1405 123/457 |
| 4,898,205 A | * | 2/1990 | Ross | ........................ | F17C 13/04 137/505.12 |
| 4,971,115 A | * | 11/1990 | Tinholt | ................ | F15B 13/0405 137/625.27 |
| 5,279,327 A | * | 1/1994 | Alsobrooks | ......... | G05D 16/0636 123/463 |
| 6,047,727 A | * | 4/2000 | Hatori | ..................... | F16K 1/305 137/505.25 |
| 6,244,295 B1 | * | 6/2001 | Bartussek | ............... | B60T 8/341 137/539 |
| 7,293,574 B2 | * | 11/2007 | Schwartz | ................ | F17C 13/04 137/505.25 |
| 8,439,064 B2 | * | 5/2013 | Maus | ...................... | F16K 17/10 137/505.25 |
| 2005/0067025 A1 | * | 3/2005 | Ricco | ..................... | F16K 17/383 137/540 |
| 2008/0011361 A1 | | 1/2008 | Larsen et al. | | |

(Continued)

FOREIGN PATENT DOCUMENTS

JP  2010-533268 A  10/2010

*Primary Examiner* — Jessica Cahill
(74) *Attorney, Agent, or Firm* — Oliff PLC

(57) ABSTRACT

In a pressure regulating valve, a piston is provided, in an end on a side closer to a seat, with a recessed portion opening on the side closer to the seat, a valve element including: a tip portion contactable with the seat; a columnar retaining part inserted in the recessed portion; and a press-fit portion protruding radially outward from an outer peripheral surface of the retaining part and being press-fitted in an inner peripheral surface of the recessed portion. The press-fit portion has a spherical shape.

4 Claims, 3 Drawing Sheets

(56) References Cited

U.S. PATENT DOCUMENTS

2010/0133460 A1\* 6/2010 Durant ............... G05D 16/0666
  251/359
2014/0130925 A1\* 5/2014 Aoba ................... B60T 8/4872
  138/31

\* cited by examiner

PRESSURE REGULATING VALVE

CROSS-REFERENCE TO RELATED APPLICATIONS

This application is based upon and claims the benefit of priority from the prior Japanese Patent Application No. 2016-075392 filed on Apr. 4, 2016, the entire contents of which are incorporated herein by reference.

BACKGROUND

Technical Field

The present invention relates to a pressure regulating valve for regulating the pressure of a fluid and more particularly to a pressure regulating valve for regulating the pressure of for example high-pressure fuel gas to a desired pressure by pressure reduction.

Related Art

As one of pressure regulating valves for regulating the pressure of a fluid, Japanese Unexamined Patent Application Publication (Translation of PCT Application Publication) No. 2010-533268 ("JP2010-533268 A") discloses a high-pressure regulator configured to bring a piston seat to be moved together with a piston into contact with or away from a seat ring in order to regulate the pressure of a fluid.

SUMMARY

Technical Problems

In the high-pressure regulator disclosed in JP2010-533268 A, during sliding within an inner bore of a body, the piston may slide while inclining for example by coaxial misalignment of the piston relative to the inner bore (i.e., deviation between their central axes). Further, if the axis of an inlet pressure chamber formed inside the seat ring and the axis of the piston are misaligned, coaxial misalignment between the seat ring and the piston seat may also be caused. This may result in deterioration in sealing strength between the seat ring and the piston seat. During valve closing, in which the seat ring is in contact with the piston seat, when the inclination of the piston is to be forcibly reduced for centering (aligning) between the seat ring and the piston seat, it is necessary to increase the pressure in an outlet pressure chamber. Thus, a pressure value (a pressure regulation value) in the outlet pressure chamber during valve closing may rise.

The present invention has been made to solve the above problems and has a purpose to provide a pressure regulating valve capable of preventing a rise in pressure regulation value.

Means of Solving the Problems

To achieve the above purpose, one aspect of the invention provides a pressure regulating valve comprising: a pressure regulating chamber; a piston movable in an axial direction in response to pressure in the pressure regulating chamber; a valve element to be moved together with the piston; and a seat with which the valve element is contactable, wherein the piston includes a piston hollow portion in an end on a side closer to the seat, the piston hollow portion opening on the side closer to the seat, the valve element comprises: a tip portion contactable with the seat; a columnar portion inserted in the piston hollow portion; and a fit portion protruding radially outward from an outer peripheral surface of the columnar portion, the fit portion being fitted in an inner peripheral surface of the piston hollow portion, and the fit portion has a spherical shape.

According to the aforementioned aspect, the valve element can incline relative to the piston while the fit portion of the columnar part of the valve element remains fit in the piston hollow portion. Therefore, even when the piston inclines or tilts or the seat and the valve element are out of coaxial alignment, the valve element has only to be simply brought in contact with the seat, so that centering of the valve element with the seat and fixing of the valve element to the piston can be achieved. Therefore, there is no need to subsequently apply the force to forcibly reduce the inclination of the piston for centering between the seat and the valve element during valve closing. This can suppress a rise in pressure regulation value.

According to the pressure regulating valve configured as above, it is possible to suppress a rise in pressure regulation value.

DETAILED DESCRIPTION OF THE EXEMPLARY EMBODIMENTS

A detailed description of a preferred embodiment of a pressure regulating valve embodying the present invention will now be given referring to FIGS. 1 to 5. In this embodiment, the invention is applied to a pressure reducing valve for reducing the pressure of high-pressure fuel gas to be supplied to a supply destination. In the following description, the terms "upstream side" and "downstream side" respectively indicate an upstream side or position and a downstream side or position in a flowing direction of fuel gas G.

A pressure regulating valve 1 is a pressure reducing valve for regulating the pressure of fuel gas G to a desired pressure by reducing the pressure of the fuel gas G. The fuel gas G in the present embodiment is for example hydrogen gas to be supplied to a vehicle fuel cell or battery (not illustrated). An upstream-side end of the pressure regulating valve 1 will be connected to a main stop valve (not shown) for allowing or stopping supply of the fuel gas G stored in a fuel tank (not shown). A downstream-side end of the pressure regulating valve 1 will be connected to an injector(s) (not shown) for supplying the fuel gas G to a fuel cell or battery.

Figure 1:
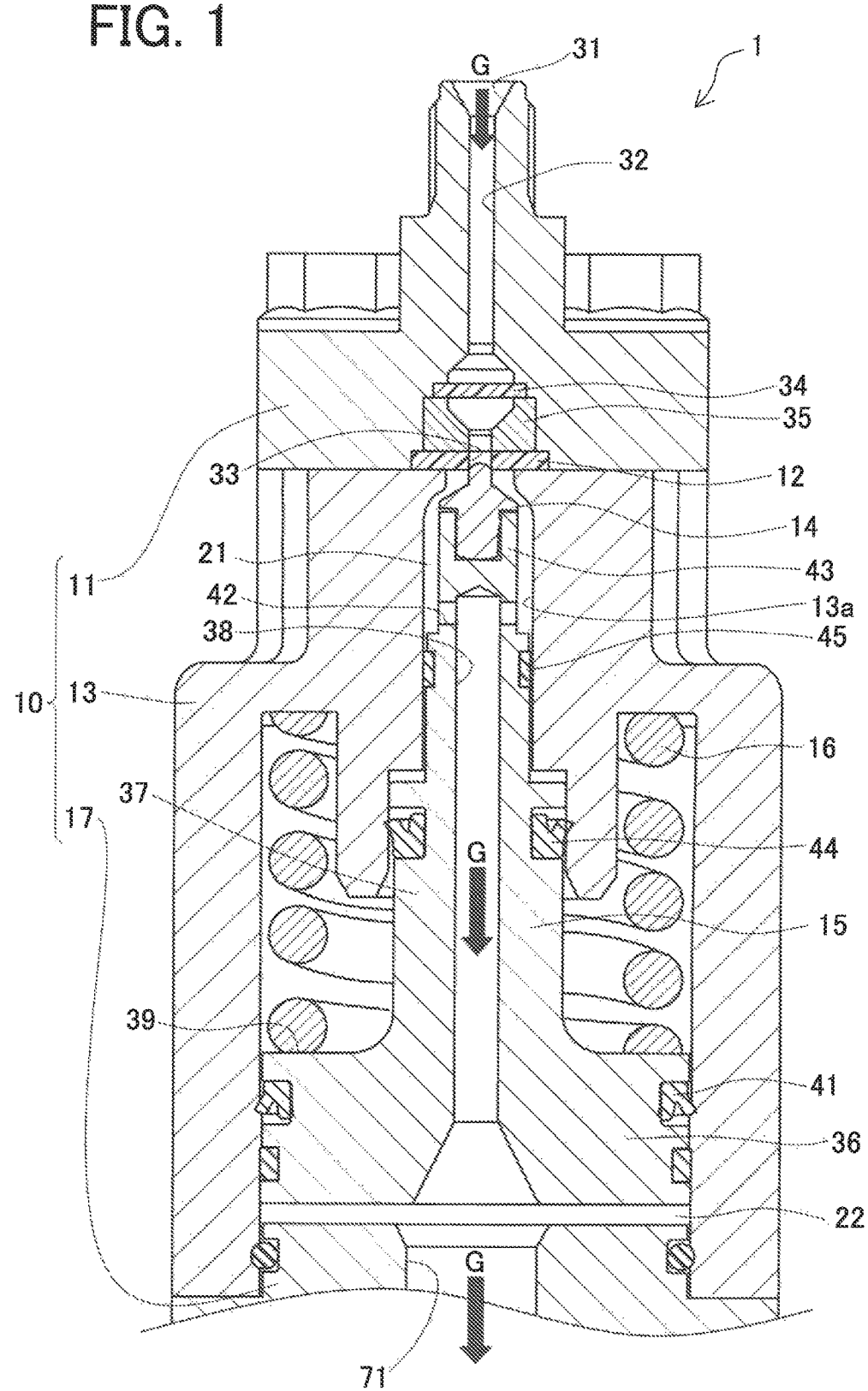
FIG. 1 is a cross-sectional view of a pressure regulating valve in an embodiment.

As shown in FIG. 1, the pressure regulating valve 1 includes a housing 10, a seat (a valve seat) 12, a valve element 14, a piston 15, a spring 16, and others. The housing 10 is mainly constituted of an inlet block member 11, a body member 13, and an outlet block member 17. The body member 13 is internally formed with a first pressure regulating chamber 21. Further, a second pressure regulating chamber 22 is defined by the body member 13, the piston 15, and the outlet block member 17. FIG. 1 shows the pressure regulating valve 1 during valve closing in which the valve element 14 is in contact with the seat 12.

The inlet block member 11 is provided with an inlet 31, an inlet passage 32, and others. The inlet 31 is an inflow port through which the fuel gas G flows into the pressure regulating valve 1. The inlet passage 32 is a passageway communicated with the inlet 31 and a seat hole (a through hole) 33 of the seat 12. In the inlet passage 32, a filter 34 is placed to allow passage of the fuel gas G while removing foreign substances contained in the fuel gas G. Further, a bush 35 is placed between the filter 34 and the seat 12.

The seat 12 is made of resin and sandwiched, pressed by a predetermined amount, between the inlet block member 11 and the body member 13. The seat 12 has a nearly circular ring shape. This seat 12 is provided with the seat hole 33 communicated with the inlet passage 32 and the first pressure regulating chamber 21.

The body member 13 is a casing of the pressure regulating valve 1 and internally house the valve element 14, the piston 15, the spring 16, and a part of the outlet block member 17.

The valve element 14 is placed in the first pressure regulating chamber 21 located downstream of the seat 12. The valve element 14 is moved together with the piston 15 within the first pressure regulating chamber 21 to come into contact with or separate from the seat 12, thereby blocking or permitting a flow of fuel gas G. Specifically, the valve element 14 serves to open and close a flow channel communicated with the seat hole 33 of the seat 12 and the first pressure regulating chamber 21. This valve element 14 is made of metal.

Figure 2:
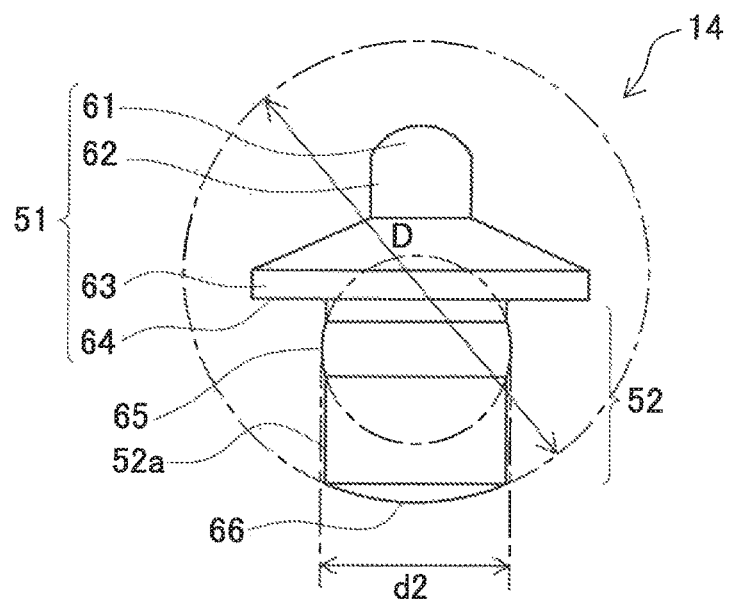
FIG. 2 is a side view of a valve element.

As shown in FIG. 2, the valve element 14 includes, in order from a side closer to the seat 12 (i.e., from an upper side in FIG. 2), a sealing part 51 contactable with the seat 12, and a retaining part 52 (a columnar part) accommodated and retained in a cup-shaped recessed portion 43 of the piston 15. The retaining part 52 is located on a side, or position, closer to the piston 15 than the sealing part 51 is.

The sealing part 51 is provided with a tip portion 61, a cylindrical portion 62, a large-diameter portion 63, and others, which are arranged in order from a closer side to the seat 12.

The tip portion 61 is a part that can contact with (seat on) the seat 12 and has a spherical shape, concretely, a hemispherical or spherical dome-like shape. Thus, the tip portion 61 of the valve element 14 can be reliably brought into intimate, line contact with the entire circumferential of the seat hole 33 of the seat 12. This tip portion 61 is contactable with the seat 12 to close the seat hole 33 during valve closing. The cylindrical portion 62 has a circular solid cylindrical shape continuous with the tip portion 61 and the large-diameter portion 63. The large-diameter portion 63 has an outer diameter larger than an outer diameter of each of the tip portion 61 and the cylindrical portion 62. The large-diameter portion 63 is provided with an end face 64 located on a side close to the piston 15 (i.e., on a side continuous with the retaining part 52).

The retaining part 52 has a nearly columnar shape. This retaining part 52 has an outer diameter smaller than an outer diameter of the end face 64 of the large-diameter portion 63 of the sealing part 51. The retaining part 52 is provided with a press-fit portion 65 (a fit portion). This press-fit portion 65 protrudes radially outward from an outer peripheral surface 52a of the retaining part 52. Specifically, the outer diameter d2 of the press-fit portion 65 is larger than the outer diameter of a remaining portion of the outer peripheral surface 52a of the retaining part 52 other than the press-fit portion 65. Further, the outer diameter d2 of the press-fit portion 65 is designed to be larger than the inner diameter d1 (see FIG. 3) of the recessed portion 43 of the piston 15 which will be described later. Accordingly, the press-fit portion 65 is press-fitted (fitted) in an inner peripheral surface 43b of the recessed portion 43 of the piston 15 (see FIG. 5). The press-fit portion 65 is formed on the retraining part 52 in the entire circumferential direction thereof.

In the present embodiment, the press-fit portion 65 of the valve element 14 has a spherical shape, concretely, a spherical segment shape, designed with a diameter equal to the outer diameter d2. Specifically, the outer peripheral surface of the press-fit portion 65 is a spherical zone or curved surface. As shown in FIG. 2, the press-fit portion 65 is located at a position above the center of the retaining part 52 in an axial direction (an up and down direction in FIG. 2.) of the valve element 14, that is, at a nearly central position of the whole valve element 14 in the axial direction.

The retaining part 52 has a contact end portion 66 which is an end to be inserted in the piston 15. This contact end portion 66 will contact with a bottom surface 43a of the piston 15 during valve closing (see FIG. 5). In the present embodiment, furthermore, the contact end portion 66 has a spherical shape, concretely, a partial spherical shape, which is a portion of a sphere having a diameter D as indicated in FIG. 2. That is, the outer surface of the contact end portion 66 is a partial spherical or rounded surface. Instead of the contact end portion 66 of the valve element 14 formed into the aforementioned spherical shape, the bottom surface 43a of the recessed portion 43 of the piston 15 may be formed into a spherical shape (a rounded surface protruding toward the opening 43e). The diameter D is set larger than the outer diameter d2.

The piston 15 is movable within the housing 10 in an axial direction (in an up and down direction in FIG. 1) in response to the pressure in the second pressure regulating chamber 22. As shown in FIG. 1, the piston 15 is provided with a body portion 36, a shaft portion 37, a passage 38, the recessed portion 43, and others. The body portion 36 has a cylindrical shape and is located at a position downstream of the shaft portion 37. The body portion 36 is provided, on a side closer to a spring 16, with a spring seat 39 (a contact portion with the spring 16) on which one end of the spring 16 abuts. On the outer peripheral surface of the body portion 36, a packing 41 which is a sealing member is placed.

The shaft portion 37 has a cylindrical shape and is placed upstream of the body portion 36. The shaft portion 37 is provided with inflow ports 42 providing communication between the passage 38 and the first pressure regulating chamber 21. The passage 38 is formed extending in an axial direction of the piston 15.

Figure 3:
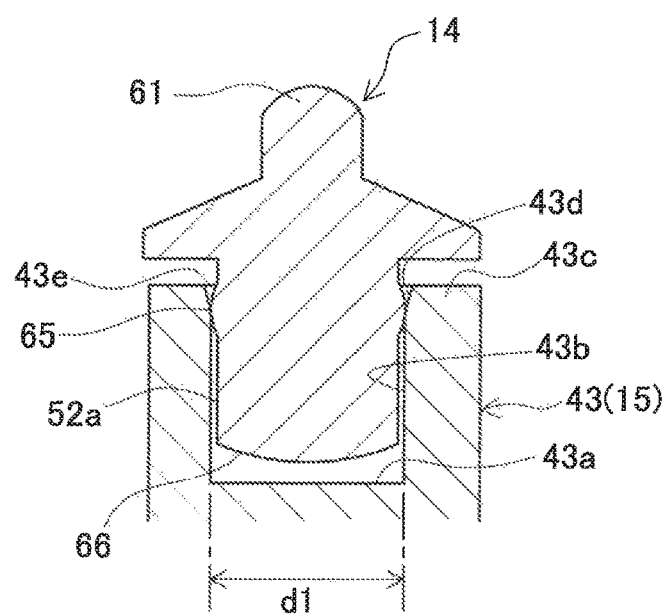
FIG. 3 is a cross-sectional view of the valve element and a recessed portion of a piston, showing that the valve element is not press-fitted yet in the recessed portion of the piston.
Figure 4:
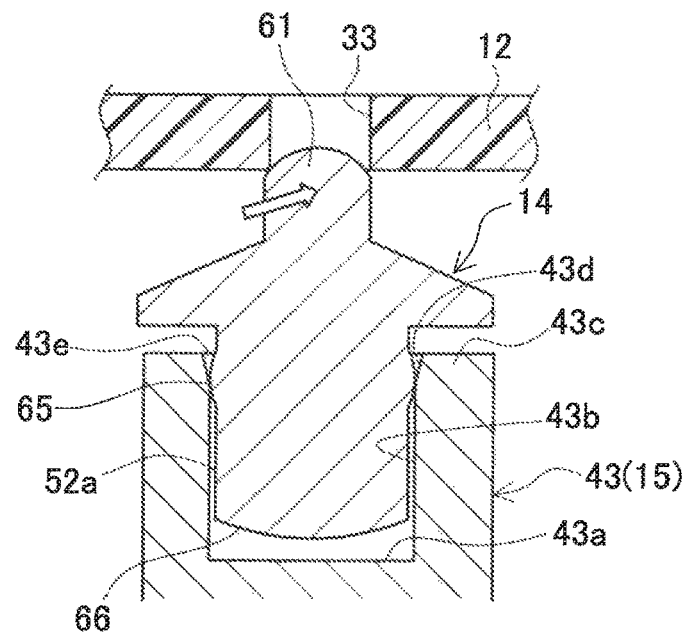
FIG. 4 is a cross-sectional view of the seat, the valve element, and the recessed portion of the piston, showing that the valve element is in the course of being press-fitted in the recessed portion of the piston.
Figure 5:
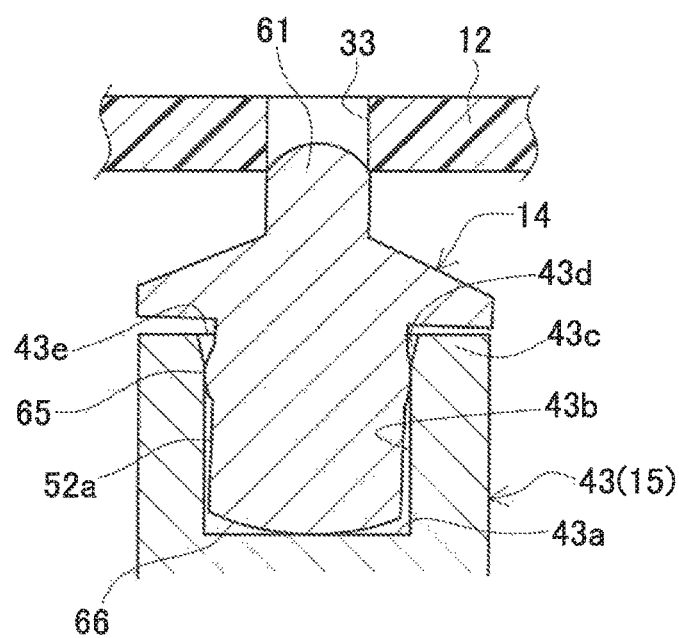
FIG. 5 is a cross-sectional view of the seat, the valve element, and the recessed portion of the piston, showing that the valve element has been completely press-fitted in the recessed portion of the piston.

The shaft portion 37 is provided, in an end on the upstream side (that is, on a side closer to the seat 12), with the recessed portion 43 (a piston hollow portion) formed in a recessed shape (a U-shaped cross-section or a cup-like shape) opening on the side closer to the seat 12, i.e., on a surface facing the seat 12, by drilling or another technique. In this recessed portion 43, a part of the valve element 14 is inserted. In the present embodiment, as shown in FIGS. 3 to 5, the recessed portion 43 includes an end portion 43c formed with an opening 43e that opens on the side closer to the seat 12 and further, in the end portion 43c, a tapered portion 43d having an inner diameter decreasing from the opening 43e toward the inside of the recessed portion 43, i.e., toward the bottom surface 43a. Further, the recessed portion 43 includes the inner peripheral surface 43b having an inner diameter d1 in a section closer to the bottom surface 43a than the tapered portion 43d is.

As shown in FIG. 1, on the outer peripheral surface of the shaft portion 37, there are mounted a packing 44 (a seal member) and a wear ring 45 (a bearing). The piston 15 is made of metal.

The spring 16 is placed between the body member 13 and the piston 15. This spring 16 urges the piston 15 in a direction toward the outlet block member 17, that is, in a valve opening direction of the valve element 14.

The outlet block member 17 is provided with a passage 71 connected to an outflow port (not shown) through which the fuel gas G flows out of the pressure regulating valve 1.

The first pressure regulating chamber 21 is provided in the housing 10, at a position downstream of the seat 12. When the valve element 14 separates from the seat 12, the first pressure regulating chamber 21 comes into communication with the inlet 31 of the inlet block member 11. The second pressure regulating chamber 22 is provided at a position downstream of the piston 15. This second pressure regulating chamber 22 is defined, in the housing 10, by the body member 13, the piston 15, and the outlet block member 17. In those first pressure regulating chamber 21 and second pressure regulating chamber 22, the pressure of the fuel gas G is regulated.

Operations (a method of operation) of the pressure regulating valve 1 in the present embodiment will be described below. For instance, when the fuel gas G starts to be supplied to a vehicle fuel cell and flows out in a direction indicated by an arrow in FIG. 1 through the passage 71, the pressure of the fuel gas G stored in the second pressure regulating chamber 22 decreases. Accordingly, the piston 15 is moved toward the outlet block member 17 by the urging force of the spring 16.

As the valve element 14 separates from the seat 12, high-pressure fuel gas G supplied from a fuel tank is allowed to flow through the inlet 31, the inlet passage 32, and the seat hole 33 of the seat 12, and then into the first pressure regulating chamber 21. Furthermore, the fuel gas G having flowed in the first pressure regulating chamber 21 further flows through the inflow ports 42 of the piston 15 and the passage 38 and into the second pressure regulating chamber 22.

Accordingly, the pressure of the fuel gas G in the second pressure regulating chamber 22 rises. When the force applied on the piston 15 by the pressure of the fuel gas G becomes larger than the urging force of the spring 16, the piston 15 is moved toward the seat 12 against the urging force of the spring 16. In association with this movement of the piston 15, the valve element 14 is caused to contact with the seat 12, thereby stopping inflow of the fuel gas G into the first pressure regulating chamber 21 and the second pressure regulating chamber 22. In this manner, the pressure of the fuel gas G in each of the first pressure regulating chamber 21 and the second pressure regulating chamber 22 is maintained at a predetermined value. To be specific, the pressure in the first pressure regulating chamber 21 and the second pressure regulating chamber 22 is regulated so that the force obtained by multiplying the area (the sectional area) of a diameter of the second pressure regulating chamber 22 sealed by the packing 41 by the pressure in the second pressure regulating chamber 22 is equal to the urging force of the spring 16.

Herein, the piston 15 is slid while being held in contact with a wall surface 13a of the body member 13 through the wear ring 45. At that time, for example, if the piston 15 is in coaxial misalignment (deviation of central axis) with the cylindrical wall surface 13a defining the first pressure regulating chamber 21 in which the piston 15 slides or the wear ring 45 has a thickness that is different or non-uniform from portion to portion, the piston 15 may slide in a tilted or inclined posture. Further, if the inlet block member 11 and the seat hole 33 of the seat 12 held in the inlet block member 11 are out of coaxial alignment, this may cause coaxial misalignment between the valve element 14 held by the piston 15 and the seat 12. When the above-mentioned tilt or inclination of the piston 15 and coaxial misalignment occur between the seat 12 and the valve element 14, a part of the valve element 14 may not come into tight contact with the seat 12 during valve closing in which the valve element 14 needs to contact the seat 12. This results in deteriorated sealing strength between the seat 12 and the valve element 14. During such valve closing, when the force to forcibly reduce the inclination of the piston 15 is to be applied to the piston 15 in order to make centering (aligning) between the seat 12 and the valve element 14, it is necessary to increase the pressure of fuel gas G in the second pressure regulating chamber 22. Therefore, a pressure value of the fuel gas G (hereinafter, referred to as a "pressure regulation value") in the second pressure regulating chamber 22 during valve closing may become higher.

In the present embodiment, therefore, assembling of the valve element 14 in the recessed portion 43 of the piston 15 will be performed in performance measurement (e.g., in a gas-tightness test of the pressure regulating valve 1) during manufacturing of the pressure regulating valve 1. In this manufacturing, centering between the seat 12 and the valve element 14 and fixing of the valve element 14 to the piston 15 are completed in advance.

To be specific, at the time of performance measurement in the manufacturing process of the pressure regulating valve 1, firstly, the valve element 14 is put in the recessed portion 43 of the piston 15 as shown in FIG. 3. The fuel gas G is then supplied to flow in the second pressure regulating chamber 22 through the inlet 31 to increase the pressure in the second pressure regulating chamber 22, thereby moving the piston 15 toward the seat 12 so that the tip portion 61 of the valve element 14 contacts with the seat 12. Thus, the valve element 14 is pushed by the seat 12 into the recessed portion 43 of the piston 15. Finally, the valve element 14 is fixed to the piston 15 while the press-fit portion 65 is press-fitted in the inner peripheral surface 43b of the recessed portion 43.

In the present embodiment, herein, the press-fit portion 65 of the valve element 14 has the spherical shape as shown in FIG. 2. Accordingly, while the press-fit portion 65 remains press-fitted in the inner peripheral surface 43b of the recessed portion 43 of the piston 15, the valve element 14 can be inclined with respect to the piston 15 about a contact portion, as a support point, of the press-fit portion 65 with the inner peripheral surface 43b of the recessed portion 43. Therefore, even in the case that the inclination of the piston 15 and the coaxial misalignment between the seat 12 and the valve element 14 have occurred, when the piston 15 is moved in the direction toward the seat 12 to bring the tip portion 61 of the valve element 14 into contact with the seat 12, the valve element 14 can be inclined with respect to the piston 15. Thus, the valve element 14 can be naturally press-fitted in the recessed portion 43 of the piston 15 while accommodating by itself the coaxial misalignment with the seat 12 and performing centering with the seat 12.

In the present embodiment, furthermore, the contact end portion 66 of the valve element 14 has the spherical shape as shown in FIG. 2. Accordingly, even when the contact end portion 66 contacts with the bottom surface 43a of the recessed portion 43 in the course of press-fitting the valve element 14 in the recessed portion 43 of the piston 15, the valve element 14 can be inclined with respect to the piston 15 about the support point defined by the contact portion of the contact end portion 66 with the bottom surface 43a of the recessed portion 43. Further, when the contact end portion 66 comes in contact with the bottom surface 43a of the recessed portion 43, the valve element 14 is no longer pushed toward the piston 15. The valve element 14 is inclined with respect to the piston 15 at the time when the tip portion 61 of the valve element 14 contacts with the seat 12, so that the valve element 14 is naturally press-fitted in the recessed portion 43 of the piston 15 while making centering with the seat 12. Thus, the valve element 14 is fixed to the piston 15.

In the present embodiment, at the time of manufacturing the pressure regulating valve 1, the seat 12 and the valve element 14 can be aligned for centering in advance and, in addition, the valve element 14 can be press-fitted and fixed in the recessed portion 43 of the piston 15 in advance. In other words, during manufacturing of the pressure regulating valve 1, the pressure in the second pressure regulating chamber 22 is raised to achieve easy completion of centering between the seat 12 and the valve element 14 and fixing of the valve element 14 to the piston 15. Therefore, when the pressure regulating valve 1 is to be used thereafter (i.e., after manufacturing of the pressure regulating valve 1), it is not necessary to apply the force to forcibly reduce the inclination of the piston 15 for centering between the seat 12 and the valve element 14 to the piston 15 during valve closing. Thus, the pressure of the fuel gas G in the second pressure regulating chamber 22 does not need to be increased. Consequently, the pressure regulating valve 1 in the present embodiment can suppress a rise in pressure adjustment value.

It is preferable that the valve element 14 is press-fitted and fixed in the recessed portion 43 of the piston 15 with a gap or clearance between a portion of the outer peripheral surface 52a of the retaining part 52 of the valve element 14 excluding the press-fit portion 65 and the inner peripheral surface 43b of the recessed portion 43 of the piston 15 and between the end face 64 of the sealing part 51 of the valve element 14 and the end portion 43c of the recessed portion 43 of the piston 15. Accordingly, when the valve element 14 is to be press-fitted in the recessed portion 43 of the piston 15, the valve element 14 can be inclined with respect to the piston 15 without being limited by the inner peripheral surface 43b and the end portion 43c of the recessed portion 43. This makes it easy to align the seat 12 and the valve element 14 for centering. The press-fit portion 65 is formed at a zone of the valve element 14 not corresponding to the position of the tapered portion 43d of the recessed portion 43 of the piston 15 after press-fitted in the recessed portion 43 of the piston 15.

The piston 15 is provided, in the end portion 43c on the opening 43e side of the recessed portion 43, with the tapered portion 43d having the inner diameter that decreases from the opening 43e toward the inside of the recessed portion 43. Accordingly, when the valve element 14 is to be press-fitted and fixed in the piston 15, the valve element 14 can move along the surface of the tapered portion 43d of the recessed portion 43. Thus, the valve element 14 can be easily press-fitted in the inner peripheral surface 43b of the recessed portion 43.

The foregoing embodiments are mere examples and give no limitation to the present invention. The present invention may be embodied in other specific forms without departing from the essential characteristics thereof. For instance, the press-fit portion 65 of the valve element 14 may be partially cut out in a circumferential direction of the retaining part 52, that is, the press-fit portion 65 does not need to continuously extend over the entire circumference of the retaining part 52.

REFERENCE SIGNS LIST

1 Pressure regulating valve
12 Seat
13a Wall surface
14 Valve seat
15 Piston
21 First pressure regulating chamber
22 Second pressure regulating chamber
31 Inlet
33 Seat hole
43 Recessed portion
43a Bottom surface
43b Inner peripheral surface
43d Tapered portion
43e Opening
45 Wear ring
52 Retaining part
52a Outer peripheral surface
61 Tip portion
65 Press-fit portion
66 Contact end portion
G Fuel gas
d1 Inner diameter (of Recessed portion)
d2 Outer diameter (of Press-fit portion)

What is claimed is:

1. A pressure regulating valve comprising:
   a pressure regulating chamber;
   a piston movable in an axial direction in response to pressure in the pressure regulating chamber;
   a valve element configured to move with movement of the piston; and
   a seat located outside of the piston, the seat being configured to contact the valve element by movement of the piston and valve element in the axial direction, wherein:
   the piston includes a piston hollow portion in an end of the piston on a first side closer to the seat relative to a second opposite side of the piston, the piston hollow portion being open towards the seat, the piston hollow portion having inner peripheral surfaces in parallel with each other when viewed in a cross-section taken along a central axis of the piston; and
   the valve element includes:
      a tip portion configured to contact the seat;
      a columnar portion inserted in the piston hollow portion; and
      a fit portion protruding radially outward from a first portion of an outer peripheral surface of the columnar portion, the fit portion being fitted in contact at a point of tangency between the fit portion and the inner peripheral surfaces of the piston hollow portion, the fit portion having a spherical shape.

2. The pressure regulating valve according to claim 1, wherein:
- the piston hollow portion has a recessed shape that opens on the first side of the piston,
- the columnar portion of the valve element is provided with a contact end portion that contacts a bottom surface of the recessed shape of the piston hollow portion, and
- the contact end portion has a spherical shape.

3. The pressure regulating valve according to claim 2, wherein the piston hollow portion includes:
- an end portion formed with an opening that opens on the first side of the piston, and
- in the end portion, a tapered portion having an inner diameter decreasing from the opening toward inside of the piston hollow portion.

4. The pressure regulating valve according to claim 1, wherein the piston hollow portion includes:
- an end portion formed with an opening that opens on the first side of the piston, and
- in the end portion, a tapered portion having an inner diameter decreasing from the opening toward inside of the piston hollow portion.

\* \* \* \* \*